(12) United States Patent
Jin

(10) Patent No.: US 9,042,044 B2
(45) Date of Patent: May 26, 2015

(54) COLOR FILTER SUBSTRATE AND METHOD OF MANUFACTURING THE SAME

(75) Inventor: Fujiang Jin, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 32 days.

(21) Appl. No.: 13/479,033

(22) Filed: May 23, 2012

(65) Prior Publication Data

US 2012/0300324 A1 Nov. 29, 2012

(30) Foreign Application Priority Data

May 24, 2011 (CN) .......................... 2011 1 0135994

(51) Int. Cl.
*G02B 5/22* (2006.01)
*G02F 1/1335* (2006.01)
*G02B 5/20* (2006.01)

(52) U.S. Cl.
CPC .......... *G02F 1/133516* (2013.01); *G02B 5/201* (2013.01); *G02F 1/133512* (2013.01)

(58) Field of Classification Search
USPC ................ 359/502, 891, 491.01; 349/80, 106
See application file for complete search history.

(56) References Cited

U.S. PATENT DOCUMENTS

| 3,681,111 A | 8/1972 | Kaplan | |
|---|---|---|---|
| 2011/0149215 A1 * | 6/2011 | Shimizu et al. | 349/106 |

FOREIGN PATENT DOCUMENTS

| CN | 101876768 A | 11/2010 | |
|---|---|---|---|
| JP | 1-235903 A | 9/1989 | |
| JP | 01235903 A * | 9/1989 | G02B 5/20 |
| JP | 10-104419 A | 4/1998 | |
| JP | 10104419 A * | 4/1998 | G02B 5/20 |
| TW | 201111910 A | 4/2011 | |

OTHER PUBLICATIONS

Extended European Search Report: dated Aug. 17, 2012; Appln. No. 12169061.4-2205.
KIPO Office Action dated Sep. 10, 2013; Appln. No. 10-2012-0055021.
KIPO Notice of Allowance dated Nov. 20, 2013; Appln. No. 10-2012-0055021.
First Chinese Office Action dated Feb. 8, 2014; Appln. No. 201110135994.4.
First EPO Communication dated Dec. 3, 2014; Appln. No. 12 169 061.4—1904.
Second EPO Communication dated Nov. 26, 2014: Appln. No. 12 169 061.4—1904.

* cited by examiner

*Primary Examiner* — Ricky Mack
*Assistant Examiner* — Mustak Choudhury
(74) *Attorney, Agent, or Firm* — Ladas & Parry LLP

(57) ABSTRACT

Embodiments of the disclosed technology relate to a color filter substrate and a method of manufacturing the same. The color filter substrate comprises a base substrate having a black matrix pattern thereon, the black matrix pattern having a plurality of openings; and a plurality of color filter layers in different colors, disposed on the base substrate and located at the openings of the black matrix pattern, the color filter layers being glass layers in different colors.

12 Claims, 2 Drawing Sheets

COLOR FILTER SUBSTRATE AND METHOD OF MANUFACTURING THE SAME

CROSS REFERENCE TO RELATED APPLICATIONS

This application claims the benefit of Chinese Patent Application No. 201110135994.4 filed May 24, 2011, the entire disclosure of which is incorporated herein by reference.

BACKGROUND

Embodiments of the disclosed technology relate to a color filter substrate and a method of manufacturing the same.

Currently, color display by Thin Film Transistor-Liquid Crystal Displays (TFT-LCDs) is realized through a Color Filter (CF) layer. The color filter layer is an optical filter in a certain color, which can transmit light with a narrow band being precisely selected and reflects or absorbs light within other bands which are undesirable. The color filter layer is usually installed in front of a light source, so that human eyes can receive light in a saturated color.

In general, the color filter layer is formed on a transparent substrate for forming a color filter substrate. Manufacture of the color filter substrate is basically divided into the following steps: first, applying a macromolecular photoresist layer which is mixed with a material for a black matrix on the substrate, and forming a pattern of the black matrix by an exposure and development process; next, applying a macromolecular photoresist layer which is mixed with a red pigment on the substrate, and forming a pattern of a red region by an exposure and development process; and forming a pattern of a green region and a pattern of a blue region sequentially by the same method and steps. Finally, a color filter layer in three primary colors of red, green and blue which are arranged by a certain rule are formed.

As the macromolecular photoresist has a lower thermal stability and lower uniformity per se, after the pigment is mixed into it, stability and uniformity of the resultant color filter are not high, either.

SUMMARY

According to an embodiment of the disclosed technology, there is provided a color filter substrate comprising a base substrate having a black matrix pattern thereon, the black matrix pattern having a plurality of openings; and a plurality of color filter layers in different colors, disposed on the base substrate and located at the openings of the black matrix pattern, the color filter layers being glass layers in different colors.

According to another embodiment of the disclosed technology, there is provided a method of manufacturing a color filter substrate, comprising: forming a matrix shaped macromolecular osmosis film which has absorbed carbon powder grains; encapsulating the matrix shaped macromolecular osmosis film which has absorbed carbon powder grains by using a molten glass liquid, so as to form a glass plate having a black matrix pattern, the black matrix pattern having a plurality of openings; filling glass raw materials, which are mixed with colorants in different colors, onto the glass plate at the openings of the black matrix pattern sequentially; and firing the glass plate, so as to fire the glass raw materials mixed with different colorants into color filter layers in different colors.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Embodiments of the disclosed technology provide a color filter substrate and a method of manufacturing the same. The color filter substrate according to embodiments of the disclosed technology has a higher uniformity and thermal stability, can endure high temperature and humidity, and has characteristics such as high transmissivity and high color purity, thereby optimizing properties of the color filter substrate, greatly improving the display effect, and prolonging lifetime of the color filter substrate.

Embodiment 1

Figure 1:
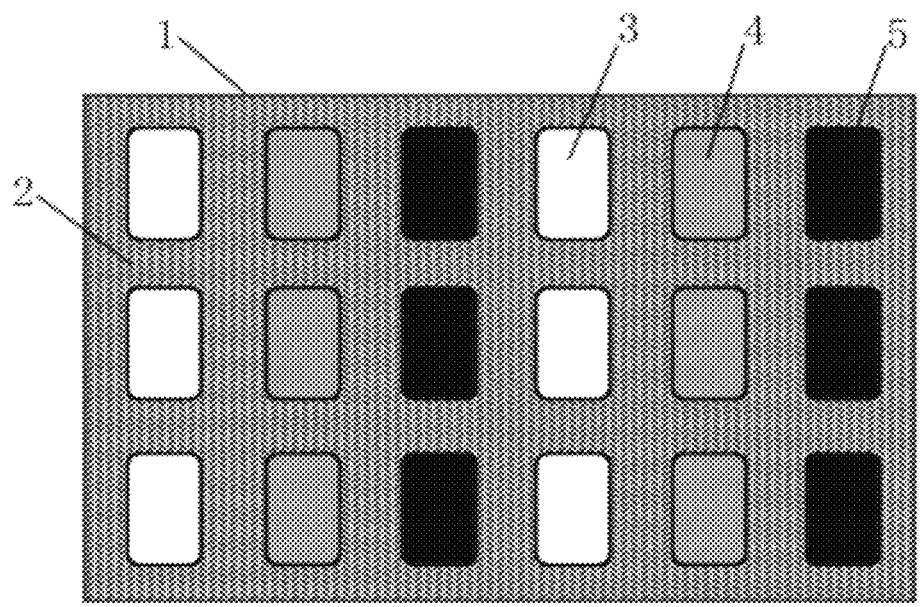
FIG. 1 is a structural schematic view showing a color filter substrate according to an embodiment of the disclosed technology.

A color filter substrate is provided by the present embodiment. As shown in FIG. 1, the color filter substrate comprises:

A glass plate 1 having a black matrix pattern 2 thereon, the black matrix pattern having a plurality of openings; and Color filter layers in different colors, which are disposed on the glass plate 1 and located at the openings of the black matrix pattern 2. The color filter layers can have two or more different colors. In an embodiment of the disclosed technology, color filter layers in three primary colors of red, green and blue are described as an example, but the disclosed technology is not limited to these colors and may have other colors. According to an embodiment of the disclosed technology, these color filter layers in different colors are glass layers.

A structure of color glass is used for color filter layers of the embodiment. Specifically, a colorant is added into a molten glass liquid to produce a color glass. For example, if the colorant of 0.4-0.7 weight % is added into ingredients for a common glass, the glass will be colored.

As an embodiment of the disclosed technology, color filter layers in three primary colors of red, green and blue are glass layers, i.e., a red glass layer 3, a green glass layer 4 and a blue glass layer 5, which are formed by firing glass raw materials mixed with a red colorant, a green colorant and a blue colorant, respectively.

Color display by a glass is caused by the fact that visible lights with different wavelengths have different transmissivities upon passing through the glass. The colorant is generally a metal oxide. Because each metal element has its unique "spectral signature", different metal oxides are capable of being shown in different colors. For instance, the glass is shown in green when chromium oxide ($Cr_2O_3$) is added into it; is shown in blue when cobalt oxide ($Co_2O_3$) is added into it; and is shown in red when copper oxide ($Cu_2O$) is added into it.

To make the color filter layers shown in three primary colors of red, green and blue, in the embodiment, the used red colorant is copper oxide, the green colorant is chromium oxide, and the blue colorant is cobalt oxide.

The glass plate with the black matrix pattern can be formed in such a way that a matrix shaped macromolecular osmosis film which has absorbed carbon powder grains is encapsulated by a molten glass liquid.

In the color filter substrate of the embodiment, the glass layers, which are formed by firing glass raw materials mixed with the red colorant, the green colorant and the blue colorant, respectively, are used as the color filter layers in three primary colors of red, green and blue; and the glass plate with the black matrix pattern, which is formed by encapsulating the matrix shaped macromolecular osmosis film which has absorbed carbon powder grains thereon by the molten glass liquid, is used as the substrate. The resultant color filter substrate has a higher uniformity and thermal stability, can endure high temperature and humidity, and has characteristics such as high transmissivity and high color purity, thereby greatly optimizing properties of the color filter substrate, improving display effect, and prolonging lifetime of the color filter substrate.

Embodiment 2

A method of manufacturing a color filter substrate is provided by the present embodiment. The manufacturing method of the embodiment will be described in detail with reference to FIGS. 2 and 3. The method comprises:

Step 101, forming a matrix shaped macromolecular osmosis film which has absorbed carbon powder grains.

Macromolecular osmosis films mostly are films which are arranged by a certain rule and have a certain arrangement shape. The macromolecular osmosis film employed by the embodiment is such a macromolecular osmosis film that its arrangement shape is a matrix shape and it can endure high temperature.

For example, the process of forming the matrix shaped macromolecular osmosis film which has absorbed carbon powder grains in the step comprises the following steps:

Step 1011, solving a macromolecular material in a solvent.

Step 1012, depositing the macromolecular material solved in the solvent on a support material by a reduced pressure method, so as to form a matrix shaped macromolecular wet film.

To make the macromolecular material into a shape of film, the reduced pressure method is used in the embodiment, i.e., a solution having the macromolecular material solved therein is on one side of the support material, and a negative pressure is applied on another side of the support material so that the solution moves in a direction toward the support material. Because gaps in the support material are limit, only the smaller water molecules are allowed to pass through, and the larger macromolecules are not allowed to pass through. Thus, the macromolecular material is deposited on the support material, thereby forming the matrix shaped macromolecular wet film. In the embodiment, the support material can be a polyester cloth. Further, the disclosed technology is not limited to deposition by means of the reduced pressure method, and other known methods can also be used to perform the deposition.

Step 1013, evaporating the solvent in the macromolecular wet film, so as to form the matrix shaped macromolecular osmosis film.

The macromolecular wet film obtained by step 1012 contains an amount of solvent. Therefore, for facilitating subsequent manufacturing steps, it is necessary to remove the solvent. The method of removing the solvent in the embodiment is evaporation, i.e., the macromolecular wet film is heated up to a temperature higher than the boiling point temperature of the solvent, and the solvent is evaporated from the macromolecular wet film.

Step 1014, placing the macromolecular osmosis film in a carbon powder solution to make carbon powder grains absorbed on the macromolecular osmosis film, so as to form the matrix shaped macromolecular osmosis film which has absorbed carbon powder grains.

To make the matrix shaped macromolecular osmosis film absorb carbon powder grains, a reduced pressure method can be used in the embodiment, i.e., a carbon powder solution having a certain concentration is located on one side of the macromolecular osmosis film, and a negative pressure is applied on another side of the macromolecular osmosis film so that the carbon powder solution moves in a direction toward the macromolecular osmosis film. Because gaps in the macromolecular osmosis film are limit, only the smaller water molecules are allowed to pass through, and the larger carbon powder grains are not allowed to pass through. Therefore, carbon powder grains are absorbed on the macromolecular osmosis film.

Figure 2:
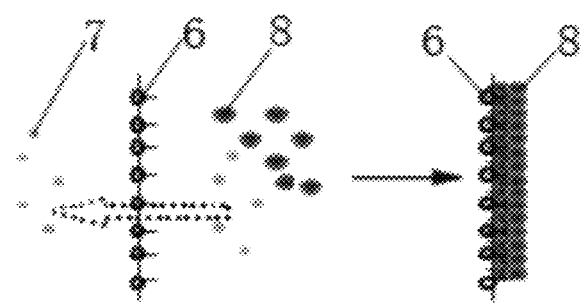
FIG. 2 is a schematic view showing an osmosis process of a carbon powder solution according to an embodiment of the disclosed technology.
Figure 3:
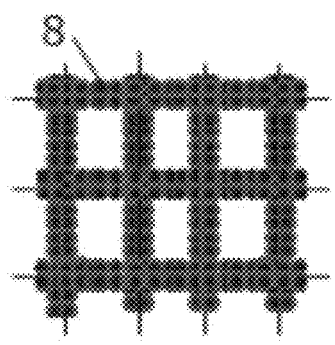
FIG. 3 is a schematic view showing a matrix shaped macromolecular osmosis film which has absorbed carbon powder grains according to an embodiment of the disclosed technology.

As shown in FIG. 2, carbon powder grains 8 can also be absorbed on the macromolecular osmosis film 6 by an osmosis effect. The principles of osmosis effect are: two solutions with different concentrations are separated from each other with a semi-permeable film (a film allowing solvent molecules to pass through, but not allowing solute molecules to pass through), water molecules or other solvent molecules enter a high concentration solution through the semi-permeable film from a low concentration solution, or the water molecules move toward a part with a low water potential through the semi-permeable film from a part with a high water potential. The latter principle is employed in the embodiment, i.e., different water potentials are formed on two sides of the macromolecular osmosis film 6. For example, the macromolecular osmosis film 6 is flatly placed on a supporter, a carbon powder solution is placed over the macromolecular osmosis film 6 to form a higher water potential, and a purified water is located under the macromolecular osmosis film 6 to form a lower water potential, so that the water molecules 7 move toward the part with the lower water potential through the macromolecular osmosis film 6 from the part with the higher water potential, thereby bringing carbon powder grains 8 along to move during movement of the water molecules 7. The macromolecular osmosis film 6 only allows smaller water molecules 7 to pass through, but not allows larger carbon powder grains 8 to pass through, and thus, as shown in FIG. 3, the carbon powder grains 8 are absorbed on the macromolecular osmosis film 6, thereby forming the matrix shaped macromolecular osmosis film 6 which has absorbed carbon power grains 8.

Step 102, encapsulating the matrix shaped macromolecular osmosis film which has absorbed carbon powder grains 8 with the use of a molten glass liquid to form a glass plate having a black matrix pattern.

The matrix shaped macromolecular osmosis film which has absorbed carbon power grains 8, which is formed by step 101, is not particularly stable. Especially for the carbon atoms, it will move in a certain condition. To fix the carbon powder grains, the molten glass liquid is used for encapsulating the matrix shaped macromolecular osmosis film, which has absorbed carbon power grains, to form the glass plate having the black matrix pattern in the embodiment. Encapsulating herein means the molten glass liquid is coated uniformly on the matrix shaped macromolecular osmosis film which has absorbed carbon powder grains, and then is cooled to make a layer of carbon power grains fixed firmly on the glass plate.

During encapsulating the matrix shaped macromolecular osmosis film which has absorbed carbon powder grains in the step, in order to avoid the macromolecular osmosis film which has absorbed carbon powder grains being damaged by the molten glass liquid, the molten glass liquid can be sprayed onto the macromolecular osmosis film absorbed with carbon powder grains in a vacuum environment; alternatively, glass powder can be heated to be melted after it is sprayed on the macromolecular osmosis film absorbed with carbon powder grains.

Step 103, sequentially filling glass raw materials, which are mixed with a red colorant, a green colorant and a blue colorant, onto the glass plate at openings of the black matrix pattern.

To fill the glass raw materials mixed with the red colorant, the green colorant and the blue colorant onto the glass plate at openings of the black matrix pattern, a single pixel injection method is used in the embodiment, i.e., the injection of glass raw material is performed for each of the openings, and then a scrapping process is performed on the glass plate having the glass raw materials injected therein, so that the glass raw materials can be coated uniformly at the openings of the black matrix pattern on the glass plate.

The manufacturing method in the embodiment comprises a process of manufacturing a color glass. During the process of manufacturing the color glass, a colorant is added into a molten glass liquid for making the color glass. For example, if the colorant of 0.4-0.7 weight % is added into ingredients for a common glass, the glass will be colored. The colorant is generally a metal oxide. Because each metal element has its unique "spectral signature", different metal oxides are capable of being shown in different colors. For instance, the glass is shown in green when chromium oxide ($Cr_2O_3$) is added into it; is shown in blue when cobalt oxide ($Co_2O_3$) is added into it; and is shown in red when copper oxide ($Cu_2O$) is added into it.

To make the color filter layers shown in three primary colors of red, green and blue, in the embodiment, the used red colorant is copper oxide, the green colorant is chromium oxide, and the blue colorant is cobalt oxide. In the embodiment, color filter layers in three primary colors of red, green and blue are described as an example, but the disclosed technology is not limited to these colors and may have other colors.

Furthermore, to make the glass plate at openings of the black matrix pattern shown in three primary colors of red, green and blue, as another embodiment of the disclosed technology, an electronic printing method and the like can also be used to firstly print pigments in three primary colors of red, green and blue on a surface of a glass, so as to form the glass plate having the three primary colors of red, green and blue.

Step 104, firing the glass plate to form a color filter layers in three primary colors of red, green and blue.

Finally, the glass plate with the glass raw materials filled therein is fired, so as to form a red glass layer, a green glass layer and a blue glass layer, and make the color filter layers in three primary colors of red, green and blue fixed tightly on the glass plate.

After the above glass plate being fired, the following steps may further comprise performing a flatness control on the fired glass plate. Herein, the control on the flatness during the process of manufacturing a glass is incorporated as well. After end of the firing, firstly, the temperature is maintained for 80 to 230 minutes (preferably, 150 minutes), then, the glass plate is placed in silicone oil at 200 to 300° C. for 15 to 20 minutes; next, it is placed in a drying room to be cooled to a room temperature; and finally it is cleaned by using carbon tetrachloride, acetone and water in sequence, thereby obtaining a color filter substrate having an improved flatness.

In addition, grinding with a brush can also be performed after the glass plate being fired, which can control the flatness of the glass plate to a certain degree.

In the method of manufacturing the color filter substrate according to the present embodiment, the matrix shaped macromolecular osmosis film which has absorbed carbon powder grains is encapsulated by a molten glass liquid, so as to form the glass plate with the black matrix pattern; and then glass raw materials mixed with the red colorant, the green colorant and the blue colorant are filled onto the glass plate at the openings of the black matrix pattern and firing is performed, so as to form color filter layers in three primary colors of red, green and blue. The color filter substrate according to the disclosed technology has a higher uniformity and thermal stability, can endure high temperature and humidity, and has characteristics such as high transmissivity and high color purity, thereby greatly optimizing properties of the color filter substrate, improving display effect, and prolonging lifetime of the color filter substrate.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A color filter substrate, comprising:
    a base substrate having a black matrix pattern thereon, the black matrix pattern having a plurality of openings; and
    a plurality of color filter layers in different colors, disposed on the base substrate and located at the openings of the black matrix pattern, the color filter layers being glass layers in different colors,
    wherein the base substrate having the black matrix pattern is a glass plate which is formed by encapsulating a matrix shaped macromolecular osmosis film which has absorbed carbon powder grains with the use of a molten glass liquid,
    wherein the base substrate is a glass substrate, and wherein the color filter layers are glass layers which are formed by firing glass raw materials mixed with colorants in different colors.

2. The color filter substrate of any of claim 1, wherein the color filter layers have three different colors, respectively, and the color filter layers in different colors are sequentially arranged at the plurality of openings of the black matrix pattern.

3. The color filter substrate of any of claim 1, wherein the color filter layers have three different colors of red, green and blue, respectively, and the colorants in different colors are a red colorant, a green colorant and a blue colorant, respectively.

4. The color filter substrate of claim 3, wherein the red colorant is copper oxide, the green colorant is chromium oxide, and the blue colorant is cobalt oxide.

5. A method of manufacturing a color filter substrate, comprising:
    forming a matrix shaped macromolecular osmosis film which has absorbed carbon powder grains;
    encapsulating the matrix shaped macromolecular osmosis film which has absorbed carbon powder grains by using a molten glass liquid, so as to form a glass plate having a black matrix pattern, the black matrix pattern having a plurality of openings;
    filling glass raw materials, which are mixed with colorants in different colors, onto the glass plate at the openings of the black matrix pattern sequentially; and
    firing the glass plate, so as to fire the glass raw materials mixed with different colorants into color filter layers in different colors.

6. The method of claim 5, wherein forming the matrix shaped macromolecular osmosis film which has absorbed carbon powder grains comprises: solving a macromolecular material in a solvent; depositing the macromolecular material which is solved in the solvent on a support material, so as to form a matrix shaped macromolecular wet film; evaporating the solvent in the matrix shaped wet film, so as to form the matrix shaped macromolecular osmosis film; and placing the macromolecular osmosis film in a carbon powder solution to make carbon powder grains absorbed on the macromolecular osmosis film, so as to form the matrix shaped macromolecular osmosis film which has absorbed carbon powder grains.

7. The method of claim 6, wherein depositing the macromolecular material on the support material comprises depositing the macromolecular material on the support material by a reduced pressure method.

8. The method of claim 7, wherein the support material is a polyester cloth.

9. The method of any of claim 5, wherein the colorants in different colors are a red colorant, a green colorant and a blue colorant, respectively.

10. The method of claim 9, wherein the red colorant is copper oxide, the green colorant is chromium oxide, and the blue colorant is cobalt oxide.

11. The method of any of claim 5, wherein, the step of filling the glass raw materials onto the glass plate at the openings of the black matrix pattern comprises filling the glass raw materials at each of the openings, respectively, and then performing a scrapping process on the glass plate filled with the glass raw materials.

12. The method of claim 5, wherein, after the glass plate being fired, further comprises:
    maintaining the temperature for 80 to 230 minutes, then, placing the glass plate into silicone oil at 200 to 300° C. for 15 to 20 minutes; next, placing the glass plate in a drying room to be cooled to a room temperature; and finally, cleaning the glass plate by using carbon tetrachloride, acetone and water sequentially.

* * * * *